3,001,909
COCCIDIOSIS CONTROL COMPOSITION

Lewis H. Sarett, Princeton, N.J., William J. Leanza, Staten Island, N.Y., and Edward F. Rogers, Middletown, N.J., assignors to Merck & Co., Inc., Rahway, N.J., a corporation of New Jersey
No Drawing. Filed Sept. 12, 1957, Ser. No. 683,448
4 Claims. (Cl. 167—53.1)

This invention relates to novel 2,4-diamino-5-hetero-6-ethylpyrimidines.

It has been found that these novel compounds possess anti-bacterial action against *Streptococcus pyogenes* which is a causative agent in udder infections or mastitis of cattle. Also, one of the novel compounds (2,4-diamino-5-(5'-chloro-2'-thienyl) - 6 - ethylpyrimidine) has been found to have the additional desirable property of potentiating sulfa drugs in coccidiosis control.

The novel compounds of this invention may be represented by the following structural formula:

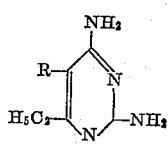

wherein R is a hetero radical, e.g., furyl, thienyl or chlorothienyl radicals. Specific examples of the novel compounds herein include 2,4-diamino-5-furyl-6-ethylpyrimidine; 2,4-diamino-5-thienyl-6-ethylpyrimidine and 2,4-diamino-5-(5'-chloro-2'-thienyl)-6-ethyl pyrimidine.

The process for preparing the novel compounds of this invention involves condensing an hetero-substituted acetonitrile with an ethyl ortho-propionate at an elevated temperature, and cyclizing the resulting product with guanidine. The method is illustrated by the synthesis of 2,4 - diamino-5-(5'-chloro-2'-thienyl)-6-ethyl-pyrimidine, as follows:

(1)

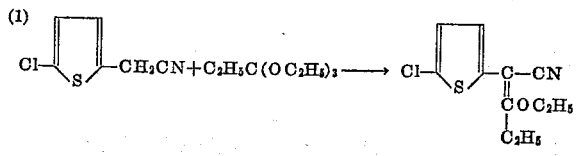

(2)

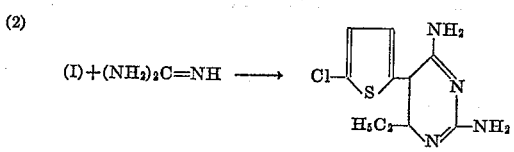

The thienyl and furyl-substituted compounds may be prepared in accordance with the foregong synthesis by starting with thienyl acetonitrile or furyl acetonitrile, respectively, in place of chloro-thienyl acetonitrile.

If desired, the thienyl- and furyl-substituted compounds of this invention may be prepared by the following reaction sequence:

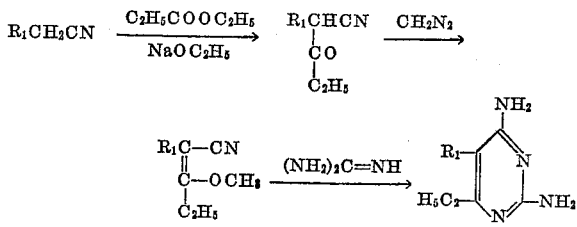

where $R_1$=the thienyl or furyl radicals.

The anti-bacterial properties of the novel compounds were tested against *Streptococcus pyogenes* (C203) by the following method:

Universal medium contained in culture tubes was inoculated with *Streptococcus pyogenes* C203 and serial double dilutions of the anti-bacterial agent were added. After 24 hours' incubation at 37° C., the dilution producing 100% bacteriostasis was observed. The endpoint concentrations for the 5-thienyl and 5-furyl compounds were 4γ/ml. for the 5(5'-chloro-2'-thienyl) compound 15γ/ml.

Activity against *S. pyogenes* implies probable activity against many other streptococcus species.

With particular regard to coccidiosis in poultry, the 2,4 - diamino- 5 -(5'-chloro-2'-thienyl)-6-ethylpyrimidine may be incorporated, along with the sulfa drugs, in the normal diet of the birds. A ratio of 1:1, by weight, of the compound of this invention and the sulfa drugs has been satisfactory. An amount of our said novel compound of 0.0125% by weight, on the total diet ration, has been found effective as a potentiating agent. Larger amounts may be employed, if desired.

The sulfa drug potentiating action of 2,4-diamino-5-(5'-chloro-2'-thienyl) - 6 - ethylpyrimidine in coccidiosis control was experimentally demonstrated according to the following test.

Groups of ten two-weeks old chicks were placed on a diet of mash feed containing a predetermined quantity of the drug. Each chick was then inoculated with 50,000 oöcysts 24 hours after administration of the drug began. Control groups of ten chicks were also infected but fed a normal, nonmedicated diet. After the diets were administered for eight days the test was terminated and the survivors sacrificed. The following results were obtained by the application of this testing procedure:

| Drug | Percent Drug in Diet | Percent Wt. Gain | No. Oocysts ×10⁻⁶ | Mortality |
|---|---|---|---|---|
| Sulfaquinoxaline | 0.0125 | 67 | 20.4 | 10 |
| 2,4 - Diamino - 5 - (5' - chloro - 2' - thienyl)-6-ethylpyrimidine | 0.0125 | 47 | 26.7 | 10 |
| Do | 0.0125 | } 65 | 2.0 | }0 |
| +Sulfaquinoxaline | 0.0125 | | | |
| Infected controls | | 30 | 22.0 | 20 |

From these results it is seen that the 2,4-diamino-5-(5'-chloro-2'-thienyl)-6-ethylpyrimidine is capable, when employed along with sulfa drugs, of greatly reducing coccidiosis infections while maintaining a satisfactory growth rate and substantially preventing deaths due to this disease.

The following examples are given in order to illustrate the preparation and some of the properties of the novel compounds.

EXAMPLE I

*Preparation of 2,4-diamino-5-furyl-6-ethylpyrimidine*

Five g. of sodium was dissolved in 85 ml. of absolute ethanol in a 500 ml. three-necked flask fitted with a stirrer, dropping funnel, condenser and gas inlet tube. The apparatus was flushed with nitrogen and an atmosphere of nitrogen maintained during the reaction and work-up of the product. Twenty-one and four tenths g. of furylacetonitrile and 22.4 g. of ethyl propionate were added and the mixture refluxed for 5 hours.

The solution was then poured into water and extracted with ether. The product was extracted into a sodium hydroxide solution which was acidified and re-extracted with ether. The ethereal solution was washed with sodium bicarbonate solution and dried over sodium sulfate. A solution of 0.15 mole of diazomethane was added and the solution kept at 0° for 18 hours. After decanting from precipitated gum the excess diazomethane and ether were removed by distillation and the residue treated with 0.2 mole of guanidine in 200 ml. of alcohol. The mixture was refluxed for 4 hours, cooled and the product precipitated by the addition of 100 ml. of water. Yield 12 g., M.P. 224–226°.

EXAMPLE II

*Preparation of 2,4-diamino-5-thienyl-6-ethylpyrimidine*

Thenyl cyanide 30 g. and ethyl propionate 28 g. were added to a solution of 6 g. of sodium in 100 ml. of ethanol. The mixture was refluxed for 6 hours and poured into water. The product was recovered as in the previous example. Twenty-three g. (55% yield) of crude product was obtained, M.P. 90°.

*Analysis.*—Calcd. for $C_9H_9OSN$: N, 7.82. Found: N, 7.48.

The crude α-propionyl thenyl cyanide was treated with diazomethane in ether at 0° overnight After removal of the excess diazomethane and ether, the crude enol ether was heated with a solution of 7.5 g. guanidine in 150 ml. of alcohol for 5 hours. A precipitate of flat metallic-looking plates formed during the reaction; and the solution darkened considerably. The product was filtered off and washed with alcohol and water. Yield 5 g., M.P. 242–4°. An additional 3 g. was obtained by concentration of the mother liquors.

EXAMPLE III

*Preparation of 2,4-diamino-5-(5'-chloro-2'-thienyl)-6-ethylpyrimidine*

Fifty-two g of 5-chloro-2-thienylacetonitrile and 30 g. of ethyl orthopropionate were heated under reflux at 160–165° for 20 hours. An additional 30 g. of orthoester was then added and the reflux was cut off so that over the next 20 hours the temperature rose to 185°. The cooled reaction mixture was diluted with 100 ml. of ether and placed in the icebox overnight. The heavy amorphous precipitate was rejected. After ether evaporation the residual oil was pumped out to remove starting materials (2 hours, bath temperature 110–115° at 1–2 mm.). The residual oil, weighing 10.5 g. was carried through the usual guanidine condensation. From the chloroform and 2 N hydrochloric acid soluble fraction of reaction product 3.2 g. of pyrimidine was obtained. Recrystallization from methanol gave crystals, M.P. 240–242°.

Some of the properties of the novel compounds are listed in the following table.

| Compound of Example | M.P., °C. | Analysis | | | | | |
|---|---|---|---|---|---|---|---|
| | | Calcd. | | | Found | | |
| | | C | H | N | C | H | N |
| 1 | 224–6 | 58.81 | 5.92 | 27.44 | 59.39 | 5.65 | 27.71 |
| 2 | 247–8 | 54.54 | 5.49 | 25.44 | 54.02 | 5.26 | 25.44 |
| 3 | 240–2 | 47.15 | 4.35 | 22.00 | 47.59 | 4.20 | 21.83 |

The foregoing illustrates the invention, which, however, is not to be limited thereby but is to be construed as broadly as permissible in view of the prior art and limited solely by the appended claims.

What is claimed is:
1. A composition of matter comprising sulfaquinoxaline and 2,4-diamino-5-(5'-chloro-2'-thienyl)-6-ethylpyrimidine, the amount of said pyrimidine being sufficient to potentiate the sulfa drug in coccidiosis control in poultry.
2. A process for treating coccidiosis in poultry which comprises feeding to a fowl infected with the causative agent of said disease a poultry feed containing sulfaquinoxaline and 2,4-diamino-5-(5'-chloro-2'-thienyl)-6-ethylpyrimidine, the pyrimidine being present in an amount effective to potentiate the sulfa drug in the coccidiosis control.
3. A process according to claim 2, the amount of sulfa drug present in the feed being about 0.0125% by weight of the feed and the amount of said pyrimidine present in the feed being about 0.0125% by weight of the feed.
4. A poultry feed comprising sulfaquinoxaline in an amount of about 0.0125% by weight of the feed and 2,4-diamino-5(5'-chloro-2-thienyl)-6-ethylpyrimidine in an amount of about 0.0125% by weight of the feed.

References Cited in the file of this patent

UNITED STATES PATENTS

| 2,602,794 | Hitchings et al. | June 14, 1950 |
| 2,895,874 | Lux | July 21, 1959 |

FOREIGN PATENTS

| 735,702 | Great Britain | Aug. 24, 1955 |

OTHER REFERENCES

Norris: The Principles of Organic Chemistry, 1922, McGraw-Hill Book Co., Inc., N.Y.C., pp. 575 and 576.